Nov. 5, 1968     J. R. O'MALLEY     3,409,116
ORIENTING DEVICE WITH ANTI-JAM MEANS
Filed Dec. 28, 1966

INVENTOR
JAMES R. O'MALLEY

BY

ATTORNEYS

United States Patent Office 3,409,116
Patented Nov. 5, 1968

3,409,116
ORIENTING DEVICE WITH ANTI-JAM MEANS
James R. O'Malley, Essex Junction, Vt., assignor to International Business Machines Corporation, Armonk, N.Y., a corporation of New York
Filed Dec. 28, 1966, Ser. No. 605,301
6 Claims. (Cl. 198—33)

ABSTRACT OF THE DISCLOSURE

A positive acting anti-jamming device for a driven rotary transport mechanism in the form of a positively driven auxiliary movable member which is moved in synchronism with the driven rotary transport means but out of contact therewith and means carried by the auxiliary member and responsive to jamming of the rotary transport mechanism for positively driving the rotary transport means in the opposite direction.

This invention relates to a device for reorienting electronic modules by 90°, and more particularly, to a rotary transport mechanism for achieving the same, including means for automatically releasing a jammed module and recycling the same.

Rotary transport mechanisms have long been used for reorienting small devices, including electronic modules, 90° or more about their axes as they are moved in single line fashion through an assembly or treatment line. Since the modules or other components have little mass and are moved at relatively high speed, it sometimes happens that the modules in abruptly changing their direction of movement become jammed between a moving portion of the transport mechanism and the stationary guide means.

In an attempt to effect immediate release of a jammed module, in the past the positive drive connection between the drive motor and the rotary transport device is broken whereby momentary forward rotation of the transport mechanism ceases. Additional means are then employed for effecting momentary retrograde movement of the transport to release the jammed article prior to continued rotation of the rotary drive means in a forward or feed direction. In one specific system, cooperating clutch faces between the driving and driven elements induce a slight counterrotative movement to the driven element as the driving and driven elements shift away from each other in response to jamming.

This type of anti-jam system is not only complicated and at times unreliable, but fails to provide the necessary assurance that sufficient retrograde movement is created during release to free the element which is jammed between the moving transport mechanism and the stationary guide member.

It is, therefore, a primary object of this invention to provide a rotary transport mechanism with anti-jam means which is positive in operation to ensure the release of the jammed article for each occurrence of jamming.

It is a further object of this invention to provide an improved rotary transport mechanism having anti-jam means of the positive type in which there is no possibility of initiating repeated anti-jam actions once the jam is removed.

The foregoing and other objects, features and advantages of the invention will be apparent from the following more particular description of a preferred embodiment of the invention as illustrated in the accompanying drawings.

In general, the present invention is directed to a workpiece transport mechanism of the type employing a positively driven rotary transport member, such as an orienting wheel. The improvement comprises an auxiliary movable member which is normally moved in synchronism with the driven rotary transport means but out of contact therewith. In response to jamming of the rotary transport means, means carried by the auxiliary member positively drives the rotary transport means in the opposite direction to release the jam.

In a preferred form, the rotary transport means comprises a first wheel and the auxiliary movable member constitutes a second wheel. Abutment means is carried by the rotary transport wheel and impact producing means is carried by the auxiliary wheel. The wheels are supported for rotation, such that the impact producing means and the abutment means move in intersecting paths. Positive drive means synchronize rotation of both wheels, whereby, as a result of transport jam, the abutment stops in the path of the impact producing means. Common means drives both the rotary transport wheel and the auxiliary movable member with torque release coupling means between the positive drive and the rotary transport wheel allowing the auxiliary movable member to continue to rotate during jamming of the rotary transport wheel.

Figure 2:
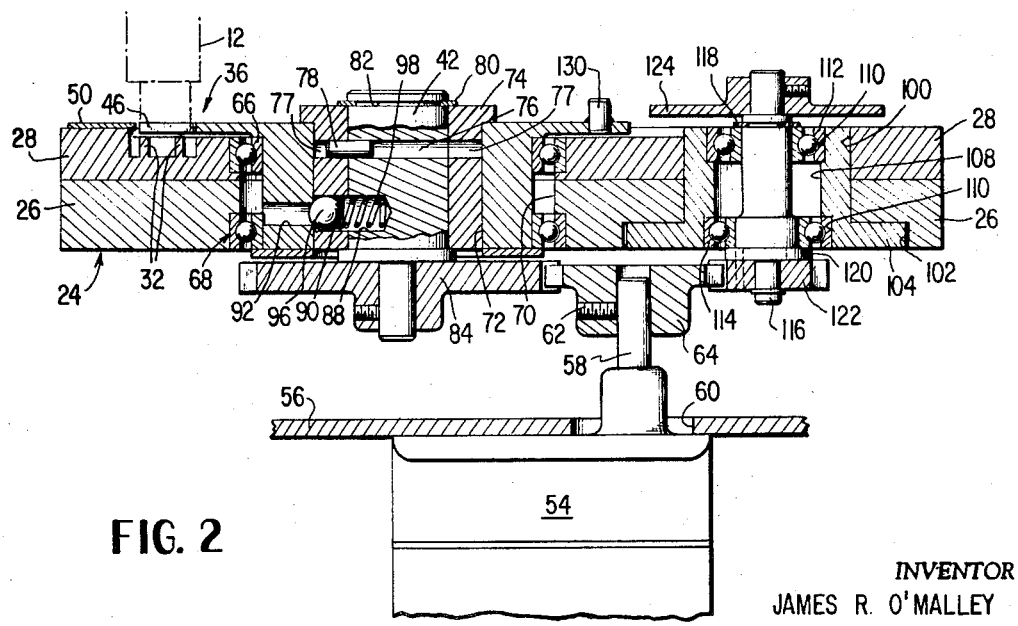
FIGURE 2 is a sectional elevational view taken about lines 2—2 of FIGURE 1.

Referring to the drawings, there is shown a rotary transport mechanism indicated generally at 10 for orienting modules indicated by the dotted line 12 in FIGURE 2, 90° and as they are being fed along a straight line conveying path. In this respect, the rotary transport mechanism may constitute a removable unit which is coupled to an elongated track section 14 carrying a pair of spaced, raised tracks 16 for supporting the modules as they are fed toward the reorienter in the direction shown by arrow 18. Spaced guide members 20 and 22 are positioned on the opposite side of the track 16 to restrain the modules laterally as they move toward the rotary transport mechanism. The rotary transport mechanism 10 includes a relatively fixed base member 24 in the form of stacked plates 26 and 28. The upper plate 28 is provided with a depressed or grooved run 30, having spaced, raised tracks 32 which terminate in the area 38 where the curved track 34 nearly intersects the incoming straight track section 16'. The track section 16' acts as a continuation of the track 16 carried by straight transport section 14. The track sections 16' rise in the same manner as tracks 32 from the recessed area 30'. The tracks 16' terminate abruptly causing the module which moves in the direction of arrow 18 toward the rotary transport orienting wheel 36 to fall upon the flattened surface area 38 below rotating orienting wheel 36.

The orienting wheel 36 is adapted to rotate about the axis of orienter shaft 42 in the direction shown by arrow 44. The wheel is generally circular but has a relieved periphery to form a series of right angle pusher surfaces 46. Surfaces 46 sequentially engage the modules as they fall off track section 16 and moves them at right angles to the direction of movement into the rotary transport. Thus, the function of the orienting wheel is to rotate the module 12, 90° about its axis from its position in leaving straight line track section 16. Pusher faces 46 are provided at three circumferentially spaced positions, 120° apart. For each complete rotation of the orienting wheel, three modules are moved from track section 16' and passed onto track section 32'. The rotary transport mechanism is provided with straight line and curved guide members 48, 50 and 52 which cooperate with each other and the orienting wheel of the rotary transport mechanism to facilitate movement of the modules through the apparatus.

To achieve positive rotation of the orienting wheel 36, an electrical drive motor 54 is shown in FIGURE 2 as being mechanically coupled to the bottom of a supporting plate 56. The supporting plate 56 is fixed relative to the rotary transport table or base 24 (by means not shown). The electric motor 54 employs a drive shaft 58 which projects upwardly through an opening 60 in the support plate 56. A driving gear 64 is fixed to the end of shaft 58 by set screw 62.

Figure 1:
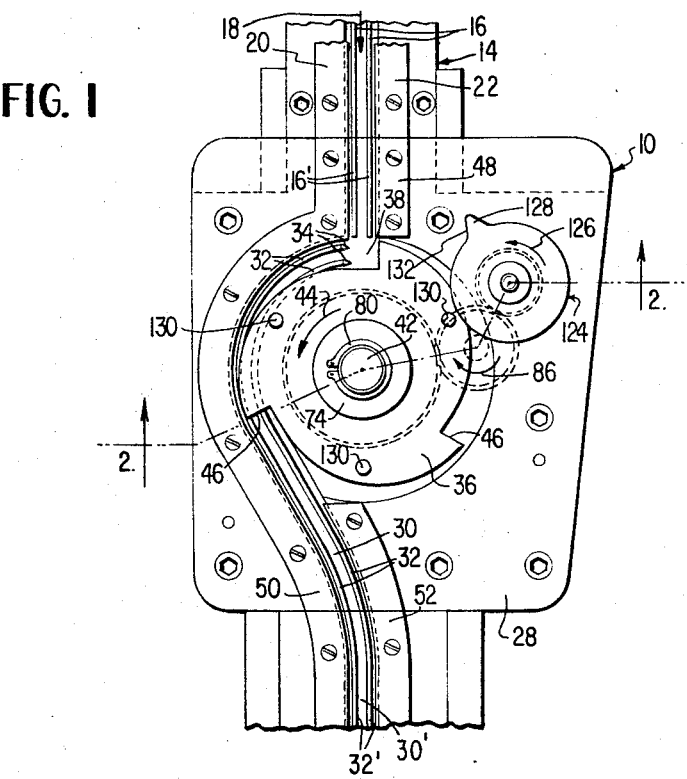
FIGURE 1 is a plan view of one embodiment of the present invention as applied to a rotary transport mechanism for 90° reorienting of modules.

On the left-hand side of the base plate 24, there are provided spaced ball bearing assemblies 66 and 68 for rotatably supporting the orienting wheel 36 within base plate opening 70. Thus, the rotating orienting wheel 36 may be rotated about the axis of wheel shaft 42. The orienting wheel includes a central bore 72 and positioned within this bore is a metallic sleeve member 74. The metallic sleeve member is positively coupled to the orienting wheel shaft 42 by means of a common transverse bore 76 and pin 78. The axial position of shaft 42 with respect to sleeve 74 is defined by a retaining ring 80 which fits within annular groove 82 carried at the upper end of the shaft. The bottom of the shaft 42 has fixedly connected thereto, a driven gear 84 which is in mesh with the driving gear 64. As shown, energization of motor 54 causes the driving gear to rotate in a clockwise direction as indicated by arrow 86 (FIGURE 1) which results in counterclockwise rotation of shaft 42. Since the shaft and the sleeve member 74 are pinned together, the sleeve member will also rotate in a counterclockwise direction. The shaft member 42 is further provided with transverse bore 88, aligned with transverse bore 90 carried by the sleeve member. Further, a third transverse bore 92 is provided within the reduced diameter base section 94 of the orienting wheel, the bore 92 being at that moment also aligned with bores 88 and 90 of the shaft and sleeve members, respectively.

A ball detent member 96 of a diameter in the order of bore 90 is carried within this bore and is spring-biased by means of coil spring 98 toward the orienting wheel. The ball detent, therefore, acts as a torque release clutch member causing frictional engagement between sleeve member 74 and the orienting wheel. The ball bearing assemblies 66–68 support the orienting wheel 36, the sleeve member 74 and the shaft 42 for rotation about the shaft axis.

With the motor 54 energized, the motor will drive the orienting wheel counterclockwise, as indicated by arrow 44 under the light coupling provided by the detent mechanism. However, if a module 12 in falling off of track 16' onto the flat surface 38 should be jammed as the pusher surface 46 tends to move it in a new direction at right angles to its original direction of movement, the rotating orienting wheel 36 is prevented from continuing its rotation in a counterclockwise direction. The positive gear connection between driving gear 64 and driven gear 84 tends to continue counterclockwise rotation of shaft 42. The ball detent member 96 will move radially inward against the bias of coil spring 98 until it disengages from the base section 94 of the orienting wheel, allowing continued rotation of shaft 42 and sleeve member 74, but not orienting wheel 36.

The present invention is particularly directed to the use of positive acting means for removing the jam and assuring continued forward feeding of the module in its reoriented position. The positive release of the jammed module is achieved by using the same driving motor for rotating a second wheel which is synchronized so as not to normally influence the rotation of the orienting wheel but to effect positive retrograde movement of the same in response to jamming.

In this respect, the base member 24 is provided on the right side, with a vertical bore 100 and a lower counter bore 102. A flanged sleeve member 104 is fixedly positioned within the bore and counter bore sections, the sleeve member being provided with a central bore 108 and upper and lower counter bores 110. Upper and lower ball bearing assemblies 112 and 114 support a de-jam wheel shaft 116 for rotation about the shaft axis. Upper and lower retaining rings 118–120 locate the shaft axially with respect to the base member. Fixed to the shaft 116, at the lower end, is a second driven gear 122, the driven gear 122 also being in mesh with the driving gear 64 on the side opposite that of the orienting wheel axis. The diameter of the driven gear 84 and the number of teeth are exactly three times the diameter and number of teeth of the driven gear 122 such that the de-jam wheel 124 carried at the upper end of shaft 116 rotates counterclockwise as indicated by arrow 126 (FIGURE 1) at three times the speed of the orienting wheel 36.

The de-jam wheel is provided with a single radial protuberance 128. On the other hand, the orienting wheel 36 is provided with three upstanding dowels 130, circumferentially positioned intermediate of the pusher faces 46. The pins are so located with respect to the preceding pusher face 46 that when jamming occurs and rotation of orienting wheel 36 ceases, the dowels 130 are now in the path of the radial extension 128 of the de-jam wheel.

The de-jamming operation is obvious. With the orienting wheel stopped, continued roation of the de-jam wheel causes the radial extension 128 to impact against the now stationary dowel 130. The radial extension 128 therefore positively drives the orienting wheel clockwise or in the opposite direction, backing off pusher face 46 from the reorienting area 38. Under positive retrograde movement, the module is no longer jammed between the pusher face 46 and the stationary guide 50. After the impact surface 132 of the radial extension 128 leaves a pin 130, and retrograde movement ceases, the continued clockwise rotation of orienting wheel shaft 42 and sleeve member 74 again drives orienting wheel 36, once the ball detent 66 engages the small diameter transverse bore 92 carried by the wheel base section 94. The orienting wheel continues to rotate, pushing modules as they fall onto the surface area 38 onto inclined track ends 34. Three modules are reoriented and fed forwardly for each full rotation of the orienting wheel, in the absence of any jam.

While the invention has been shown in connection with a rotary transport mechanism in the form of a peripherally relieved wheel including pusher faces to cause 90° reorientation of the workpieces and an auxiliary movable member as a second wheel rotated about an axis parallel to the axis of the transport wheel, it is readily apparent that both the rotary transport means and the auxiliary movable member could comprise movable members in forms other than wheels, such as endless belts, etc. Further, while a common positive drive means is employed for rotating both the transport mechanism and the auxiliary movable member in synchronism, individual drive means could be used for the respective members. Further, while the invention has been applied to a specific type of rotary transport mechanism to achieve 90° reorientation of electronic modules moving in serial fashion through the transport mechanism, it is obvious that the invention may be employed in rotary transport mechanisms which do not achieve workpiece reorientation.

What is claimed is:

1. In a transport mechanism including driven rotary transport means, the improvement comprising; an auxiliary movable member continuously driven in the same direction, means for positively moving said auxiliary member in synchronism with said driven rotary transport means but out of contact therewith, torque release coupling means between said drive means and said rotary transport means, and means carried by said auxiliary member and responsive to jamming of said rotary transport means, whereby during jamming, said torque release means disconnects said rotary transport means and said drive means and said auxiliary movable member continues to move to positively relese said jammed rotary transport means.

2. The transport mechanism as claimed in claim 1 wherein torque release coupling comprises a spring-biased ball detent carried by said driving means, a cooperating ball receiving recess carried by said rotary transport wheel, whereby said wheel rotatets under light frictional restraint to prevent damage to workpieces in response to transport jamming.

3. The transport mechanism as claimed in claim 1 further including; common drive means for positively driving both said rotary transport means and said auxiliary movable member.

4. The transport mechanism as claimed in claim 1 wherein said rotary transport means comprises a first wheel and said auxiliary movable member comprises a second wheel, and said mechanism further includes; abutment means carried by said rotary transport wheel, impact producing means carried by said auxiliary wheel, means for supporting said rotary transport wheel and said auxiliary wheel such that said impact producing means and said abutment means moves in intersecting pass, and means for synchronizing rotation of said rotary transport wheel and said auxiliary wheel whereby as a result of transport jam said abutment means stops in the path of said impact producing means.

5. The transport mechanism as claimed in claim 4 wherein said impact producing means comprises a radial projection on said auxiliary wheel periphery and said abutment comprises a pin carried by said rotary transport wheel.

6. The transport mechanism as claimed in claim 4 wherein said rotary transport wheel includes multiple peripherally relieved areas forming pusher faces for reorienting a workpiece carried by said transport mechanism, and said pins are circumferentially positioned intermediate of said pusher faces.

References Cited

UNITED STATES PATENTS

| 1,583,889 | 5/1926  | Lariviere. |              |
|-----------|---------|------------|--------------|
| 2,498,515 | 2/1950  | Wagner     | 64—29 X      |
| 2,814,376 | 11/1957 | Hood       | 198—33       |
| 2,906,391 | 9/1959  | Pasotti    | 64—29 X      |
| 2,973,608 | 3/1961  | Killion    | 198—33 X     |
| 3,134,939 | 5/1964  | Eddy       | 192—150 X    |

FOREIGN PATENTS 491,573    2/1919   France.

RICHARD E. AEGERTER, *Primary Examiner.*

M. L. AJEMAN, *Assistant Examiner.*